United States Patent
Shukla et al.

(10) Patent No.: US 9,780,827 B2
(45) Date of Patent: Oct. 3, 2017

(54) BUTTON INTEGRATION FOR AN ELECTRONIC DEVICE

(71) Applicant: Apple Inc., Cupertino, CA (US)

(72) Inventors: Ashutosh Y. Shukla, Santa Clara, CA (US); Tyler B. Cater, Cupertino, CA (US); Sawyer I. Cohen, Sunnyvale, CA (US); Edward S. Huo, San Jose, CA (US); David A. Pakula, San Francisco, CA (US); Benjamin Shane Bustle, Cupertino, CA (US); Dhaval N. Shah, Fremont, CA (US); Yaocheng Zhang, Cupertino, CA (US); Vivek Katiyar, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/263,259

(22) Filed: Sep. 12, 2016

(65) Prior Publication Data

US 2016/0380663 A1 Dec. 29, 2016

Related U.S. Application Data

(63) Continuation-in-part of application No. 14/550,814, filed on Nov. 21, 2014, now Pat. No. 9,473,609, (Continued)

(51) Int. Cl.
*H01H 1/64* (2006.01)
*H01H 1/66* (2006.01)
(Continued)

(52) U.S. Cl.
CPC ........... *H04B 1/3888* (2013.01); *H01H 13/06* (2013.01); *H04M 1/026* (2013.01);
(Continued)

(58) Field of Classification Search
CPC ............ H01H 13/06; H01H 2205/016; H01H 2207/032; H01H 2213/016;
(Continued)

(56) References Cited

U.S. PATENT DOCUMENTS 8,222,553 B2 * 7/2012 Zieder .................... H01H 13/48 200/406
9,473,609 B2 10/2016 Shukla et al.
(Continued)

FOREIGN PATENT DOCUMENTS

JP 2007165317 A 6/2007

OTHER PUBLICATIONS

PCT Application No. PCT/US2014/066754—International Search Report and Written Opinion dated Jun. 9, 2015.

*Primary Examiner* — Anthony R. Jimenez
(74) *Attorney, Agent, or Firm* — Downey Brand LLP

(57) ABSTRACT

This application relates to various button related embodiments for use with a portable electronic device. In some embodiments, a snap clip can be integrated with a button bracket to save space where two separate brackets would take up too much space in the portable electronic device. In other embodiments, a tactile switch can be waterproofed by welding a polymeric layer atop a tactile switch assembly. In this way water can be prevented from contacting moisture sensitive components of the tactile switch assembly. The weld joining the polymeric layer to the tactile switch can include at least one gap to trapped gas surrounding the tactile switch assembly to enter and exit during heat excursions caused by various operating and/or assembly operations.

20 Claims, 14 Drawing Sheets

Related U.S. Application Data which is a continuation of application No. PCT/US2014/066754, filed on Nov. 21, 2014.

(60) Provisional application No. 62/047,494, filed on Sep. 8, 2014.

(51) Int. Cl.

| | | |
|---|---|---|
| *H01H 9/02* | (2006.01) | |
| *H01H 9/06* | (2006.01) | |
| *H01H 13/00* | (2006.01) | |
| *H01H 19/04* | (2006.01) | |
| *H01H 19/08* | (2006.01) | |
| *H01H 21/00* | (2006.01) | |
| *H04B 1/3888* | (2015.01) | |
| *H01H 13/06* | (2006.01) | |
| *H04M 1/23* | (2006.01) | |
| *H04M 1/02* | (2006.01) | |
| *H04B 1/38* | (2015.01) | |

(52) U.S. Cl.
CPC ......... *H04M 1/0249* (2013.01); *H04M 1/236* (2013.01); *H01H 2205/016* (2013.01); *H01H 2207/032* (2013.01); *H01H 2213/00* (2013.01); *H01H 2213/002* (2013.01); *H01H 2213/016* (2013.01); *H01H 2223/002* (2013.01); *H04B 2001/3894* (2013.01)

(58) Field of Classification Search
CPC ...... H01H 2213/002; H01H 1/64; H01H 1/66; H01H 9/02; H01H 9/06; H01H 19/04; H01H 19/08; H01H 21/00; H01H 211/00; H01H 2213/00; H01H 2223/002; H01H 2223/044; H01H 2227/024; H01H 1/00; H01H 1/06; H01H 1/10; H01H 3/00; H01H 3/12; H01H 5/00; H01H 5/04; H01H 9/00; H01H 9/04; H01H 9/26; H01H 9/041; H01H 13/00; H01H 13/14; H01H 13/50; H01H 13/72; H01H 13/76; H01H 13/702; H01H 13/82; H01H 13/86; H01H 2003/12; H01H 2009/00; H01H 2009/02; H01H 2009/0214; H01H 2009/0285; H04B 2001/3894; H04B 1/3888; H04M 1/0249; H04M 1/026; H04M 1/236
USPC .... 200/5 A, 293, 302.2, 330, 515, 600, 400, 200/402, 510–513, 264, 329, 341, 468, 200/282, 291, 302.1, 306, 345, 50.01, 200/50.02, 303, 516
See application file for complete search history.

(56) References Cited

U.S. PATENT DOCUMENTS

| | | |
|---|---|---|
| 2007/0140614 A1 | 6/2007 | Kim et al. |
| 2011/0214977 A1 | 9/2011 | Hill et al. |
| 2011/0226601 A1* | 9/2011 | Blakely ................ H01H 35/343 200/512 |
| 2012/0186959 A1* | 7/2012 | Chen .................... H04M 1/236 200/329 |
| 2013/0118876 A1 | 5/2013 | Strittmatter |
| 2013/0176695 A1 | 7/2013 | Mittleman et al. |
| 2014/0000102 A1 | 1/2014 | Yamauchi et al. |
| 2014/0001022 A1 | 1/2014 | Weber et al. |
| 2014/0069782 A1 | 3/2014 | Shedletsky et al. |
| 2014/0252882 A1 | 9/2014 | Dinh et al. |
| 2016/0071660 A1 | 3/2016 | Shukla et al. |

* cited by examiner

BUTTON INTEGRATION FOR AN ELECTRONIC DEVICE

CROSS REFERENCE TO RELATED APPLICATIONS

This application is a continuation of U.S. application Ser. No. 14/550,814, filed Nov. 21, 2014, entitled "BUTTON INTEGRATION FOR AN ELECTRONIC DEVICE", which is a continuation of International PCT Application No. PCT/US14/66754, with an international filing date of Nov. 21, 2014, and claims priority to U.S. Provisional Application No. 62/047,494, filed Sep. 8, 2014 and entitled "BUTTON INTEGRATION FOR AN ELECTRONIC DEVICE", which is incorporated by reference herein in its entirety for all purposes.

FIELD

The described embodiments relate generally to user interface features. More particularly, the present embodiments relate to means for improving performance of and integrating user interface features into space constrained devices.

BACKGROUND

Recent advances in portable computing have allowed increasingly numerous numbers of components and sensors o be packed within a small form factor device housing. Accordingly, many components and/or functions may need to be combined and/or integrated together to accommodate increases in function that include additional parts and space within the device housing. In particular, fastening systems often need to be distributed around an interface between two components. When the joined components are joined around a periphery of the device, such fastening systems can compete for space with user interface elements distributed along the periphery of the device. Unfortunately, in some embodiments tight spacing of such components can prevent proper sealing of the device components and/or preclude placement of a user interface element in a convenient position.

SUMMARY

This paper describes various embodiments that relate to integration of button features on a portable electronic device.

A button assembly is disclosed. The button assembly includes at least the following components: a switch body; a tactile switch coupled with the switch body; and a polymeric film extending over and surrounding the tactile switch. The polymeric film is welded to the switch body by a weld that defines a number of gaps that allow air to pass into and out of an interior volume defined by the switch body and the polymeric film without allowing liquids to enter the interior volume through a joint formed by the weld.

An electronic device is disclosed. The electronic device includes at least the following: a housing; a display assembly, including a substantially transparent display cover; a button assembly. The button assembly includes at least the following: a button cap configured to receive a user input and positioned within an opening defined by the substantially transparent display cover; a switch body; a tactile switch coupled with a first surface of the switch body and configured to receive the user input by way of the button cap; and a polymeric film coupled to the switch body so that an interior volume is defined by the polymeric film and the switch body. An interface between the polymeric film and the switch body prevents liquids from entering the interior volume through the interface.

A button bracket for supporting button circuitry is disclosed. The button bracket includes at least the following elements: a rigid substrate defining a plurality of fastener openings; a tactile switch mounted to a first end of the rigid substrate; and a snap clip coupled with a second end of the rigid substrate. The rigid substrate is configured to be attached to a housing body by way of the fastener openings. The snap clip is configured to receive a rail extending from a protective cover that cooperates with the housing body to define an internal volume for an electronic device.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
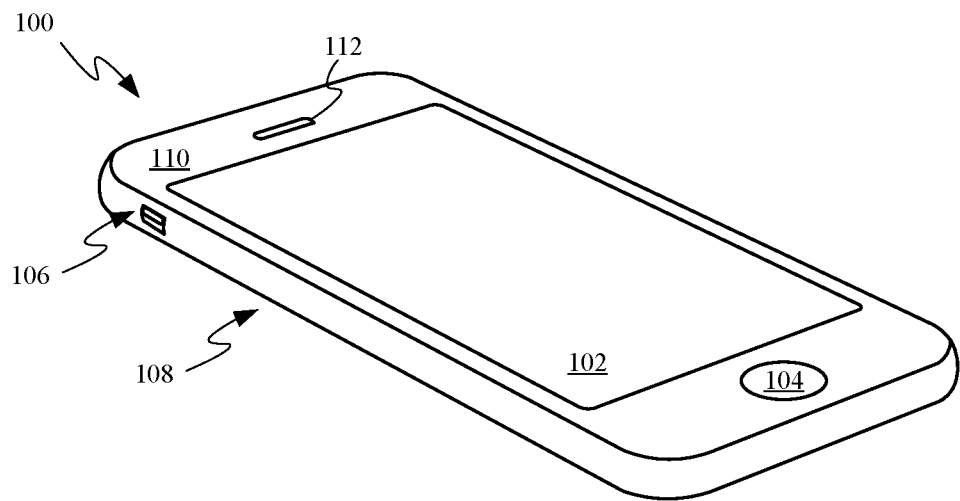
FIGS. 1A-1B show a perspective view and top view of an exemplary portable electronic device suitable for use with the described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments relate primarily to features configured to integrate various user interface components along the lines of buttons into a portable electronic device. In some embodiments, a button bracket can be configured to include a retention mechanism that functions to connect two housing components together to form a device housing. The button bracket can be fastened to a first housing component by a number of fasteners. A first end of the button bracket can include features for supporting a tactile switch proximate to an interior surface of the first housing component that defines an opening for a button. When the button is actuated the button bracket provides a rigid substrate against which a tactile switch can be compressed by actuation of the button. Electrical contacts on the tactile switch can then relay a number of signals to a processor disposed within the device housing so that the processor can carry out actions consistent with actuation of the button. A second end of the button bracket can include a retention mechanism that includes a snap clip configured to grip a windowed opening defined by a portion of a second housing component. When the snap clip engages the windowed opening the first component can be secured with the second component.

A method for optimizing waterproofing of a tactile switch button of the portable electronic device is disclosed. A polymeric film can be welded over the tactile switch button to prevent liquids from contacting moisture sensitive portions of the tactile switch button. Unfortunately, when the polymeric film completely seals around the tactile switch button various assembly processes that generate heat can cause substantial expansion of gases trapped around the tactile switch button. This expansion can cause undesirable stretching of the polymeric film, which can adversely affect performance of the tactile switch. One solution to this problem is to interrupt the welding pattern so that small gaps can be left in the weld to permit the free exchange of air into and out of an area surrounding the tact switch button. In some embodiments, the gaps can be small enough so that surface tension of various liquids prevents the liquids from flowing into the tact switch button. In some embodiments, the gaps can be sealed after the tactile switch is installed in the portable electronic device.

These and other embodiments are discussed below with reference to FIGS. 1A-10B; however, those skilled in the art will readily appreciate that the detailed description given herein with respect to these figures is for explanatory purposes only and should not be construed as limiting.

Figure 1B:
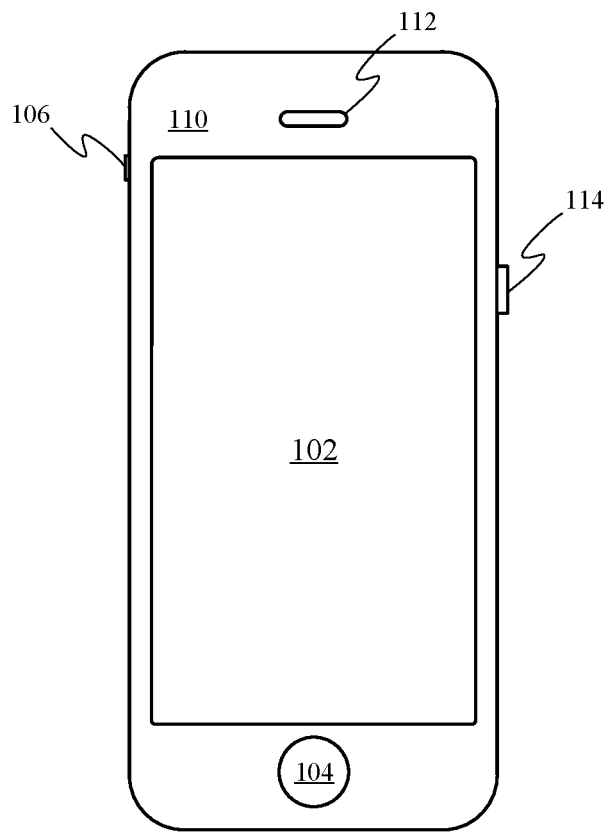

FIGS. 1A-1B show perspective views of electronic device 100 that is suitable for use with the described embodiments. Electronic device 100 includes display assembly 102. Display assembly 102 can be utilized to present a touch based user interface to a user of electronic device 100. In some embodiments, electronic device 100 also includes another user interface element along a top surface of electronic device 100 depicted as button 104. Button 104 can be configured to perform specific functions depending on an operating state of electronic device 100. In some embodiments, button 104 can be configured to return electronic device 100 to a higher-level menu and/or terminate use of a currently selected application. In other embodiments, a function of button 104 can be user configurable. Electronic device 100 can also include switch 106. Switch 106 can serve many functions. In one embodiment switch 106 can extend through an opening defined by a sidewall of housing body 108 so that a user can alternate between different behaviors of electronic device 100. For example, in some embodiments, switch 106 can allow electronic device 100 to change between an audible mode and a silent mode. Housing body 108 can be formed from a number of integrally formed sidewalls that cooperate with a bottom wall to define an interior volume or cavity in which many internal components can be positioned and protected. It should be noted that electronic device 100 can include many other buttons and or user interface elements not specifically discussed. FIG. 1B shows how a top surface of electronic device 100 can be covered by cover glass 110. Cover glass 110 can define an opening 112 associated with an audio port configured to generate audio signals generated within electronic device 100 that exit electronic device 100 through opening 112. In some embodiments, the audio signals can be along the lines of audio signals associated with telephone conversations. In other embodiments, media files can be played back through the audio port. Opening 112 can be covered by a layer or multiple layers of mesh that prevents most contaminates from entering into electronic device 100, while allowing audio signals to pass through the layers of mesh substantially unhindered. Electronic device 100 can also include another user interface element along the lines of button 114. Button 114 can be utilized in any number of ways including for powering on and off electronic device 100.

Figure 2A:
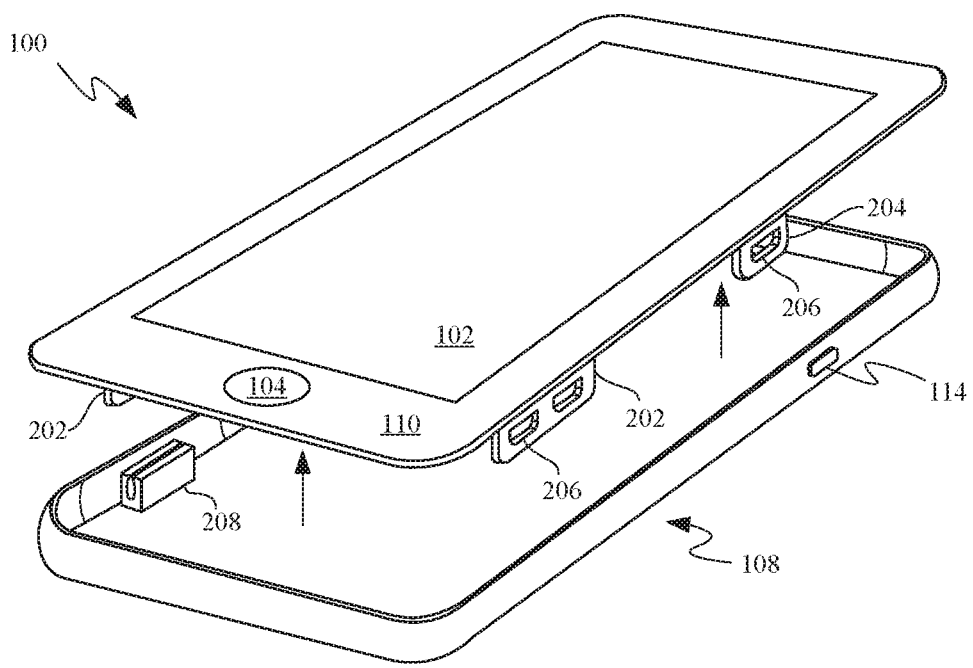
FIG. 2A shows a perspective view of the portable electronic device depicted in FIGS. 1A-1B with a cover glass layer and display assembly removed to expose various joining components.
Figure 2B:
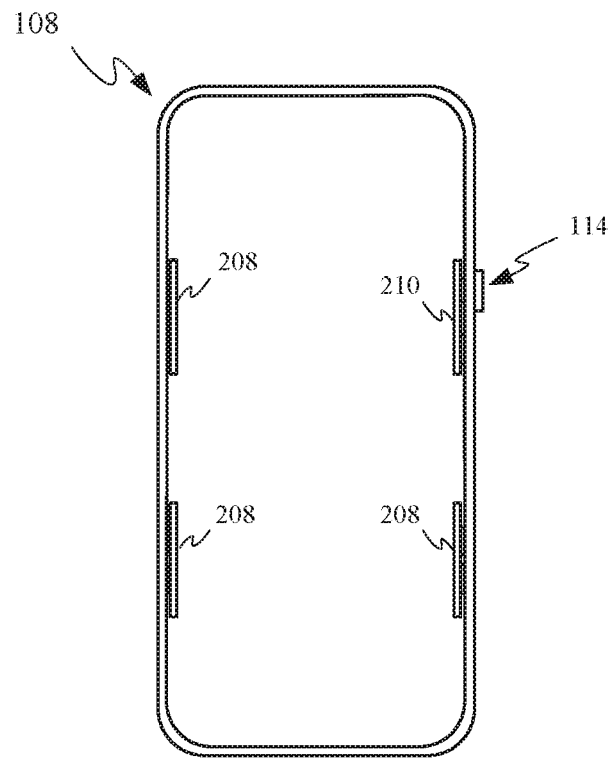
FIG. 2B shows a top view of the portable electronic device depicted in the preceding figures to reveal how various retention mechanisms are distributed throughout a housing body of the portable electronic device.

FIG. 2A shows a perspective view of electronic device 100 after removing cover glass 110. As depicted, cover glass 110 includes rails 202 and 204 that extend into housing body 108 when cover glass 110 is joined to housing body 108. Openings 206, defined by rails 202 and 204, allow rails 202 to be engaged by a number of snap clips included in retention mechanism 208 that is disposed within and coupled to housing body 108. Housing body 108 can have an undercut geometry that allows the snap clips of retention mechanisms 208 to plastically deform into the undercut as openings 206 of rails 202 are engaged by retention mechanisms 208. Rail 204 can define a single opening so that circuitry and components associated with button 114 can be accommodated. FIG. 2B shows a top view of housing body 108 with cover glass 110 removed from housing body 108. While housing body 108 includes numerous internal components, most of the internal components have been excluded from this drawing to focus on components related to this disclosure. FIG. 2B shows a distribution of retention mechanisms 208 and notably button bracket 210, which is configured to act both as a button bracket that supports components and switches associated with button 114 as well as including a snap clip configured to receive and engage with opening 206 of rail 204.

Figure 3A:
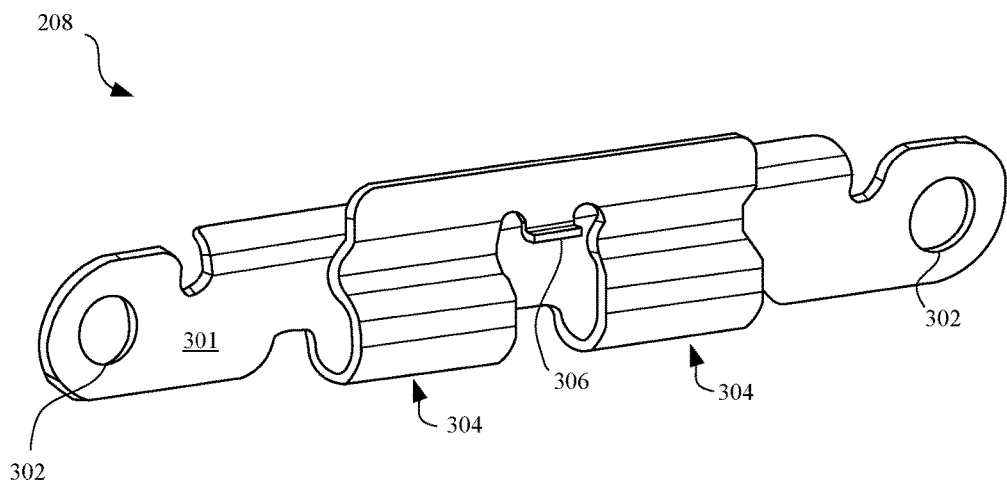
FIG. 3A shows a perspective view of a retention mechanism that includes a number of snap clips configured to receive a rail extending from a protective cover of the portable electronic device depicted in the preceding figures.
Figure 3B:
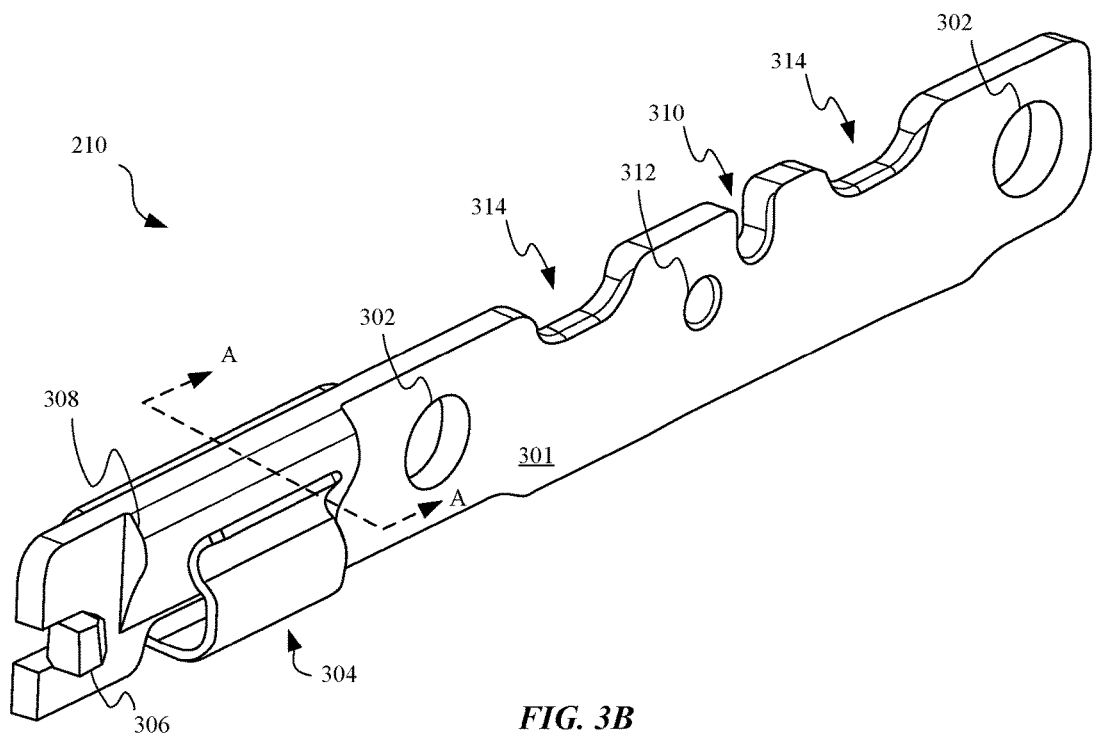
FIG. 3B shows a perspective view of a button bracket combined with a snap clip that provides a backing for a button and a snap clip for receiving a rail connected to the protective cover of the portable electronic device.

FIGS. 3A and 3B show perspective views of both retention mechanisms 208 and button bracket 210. FIG. 3A depicts retention mechanism 208, which can be mounted to an interior surface of housing body 108 (not shown) by way of fastener openings 302. In some embodiments, retention mechanisms 208 are formed from metal substrate 301 and affixed to an interior surface of a sidewall that defines housing body 108. Metal substrate 301 can be formed from any number of rigid metals, such as for example, steel and aluminum. Retention mechanism 208 includes two distinct snap clips 304. In some embodiments snap clips 304 can be joined by a length of metal that includes z-retention feature 306. Z-retention feature 306 can extend into a component arranged along an interior wall of housing body 108. In this way z-retention feature can prevent movement of the component in at least a z-direction.

FIG. 3B depicts button bracket 210 formed of metal substrate 301, which also includes fastener openings 302. In some embodiments, snap clip 304 of button bracket 210 can be welded to button bracket 210, while in other embodiments, snap clip 304 can be integrally formed with button bracket 210. In embodiments where snap clip 304 is welded to button bracket 210, snap clip 304 can be formed by a stamping snap clip 304 from a sheet of steel. Button bracket 210 includes a thickened region 308 that is configured to meet a distal end of snap clip 304. Thickened region 308 can be formed along one surface of metal substrate 301 as part of a forging process resulting in the formation of a solid protrusion taking the form of thickened region 308. As depicted, a first end of snap clip 304 can be welded to button bracket 210, while a second end of snap clip 304 can meet thickened region 308. At least a portion of the circuitry associated with button 114 can be positioned within slot 310. The circuitry can be fastened to button bracket 210 by engaging the circuitry with a fastener that passes through circuitry opening 312. It should be noted that slots 314 arranged on either side of slot 310 can also be configured to accommodate various portions of the circuitry. In some embodiments, only a dome switch can be arranged on a side of button bracket 210 facing the opening in the wall through which button 114 extends. In other embodiments, supporting circuitry can also be secured to one side of button bracket 210. FIG. 3B shows z-retention feature 306 positioned at one end of metal substrate 301. In some embodiments, z-retention feature 306 can be formed by bending a central portion of metal substrate 301 away from a remaining portion of metal substrate 301, as depicted.

Figure 3C:
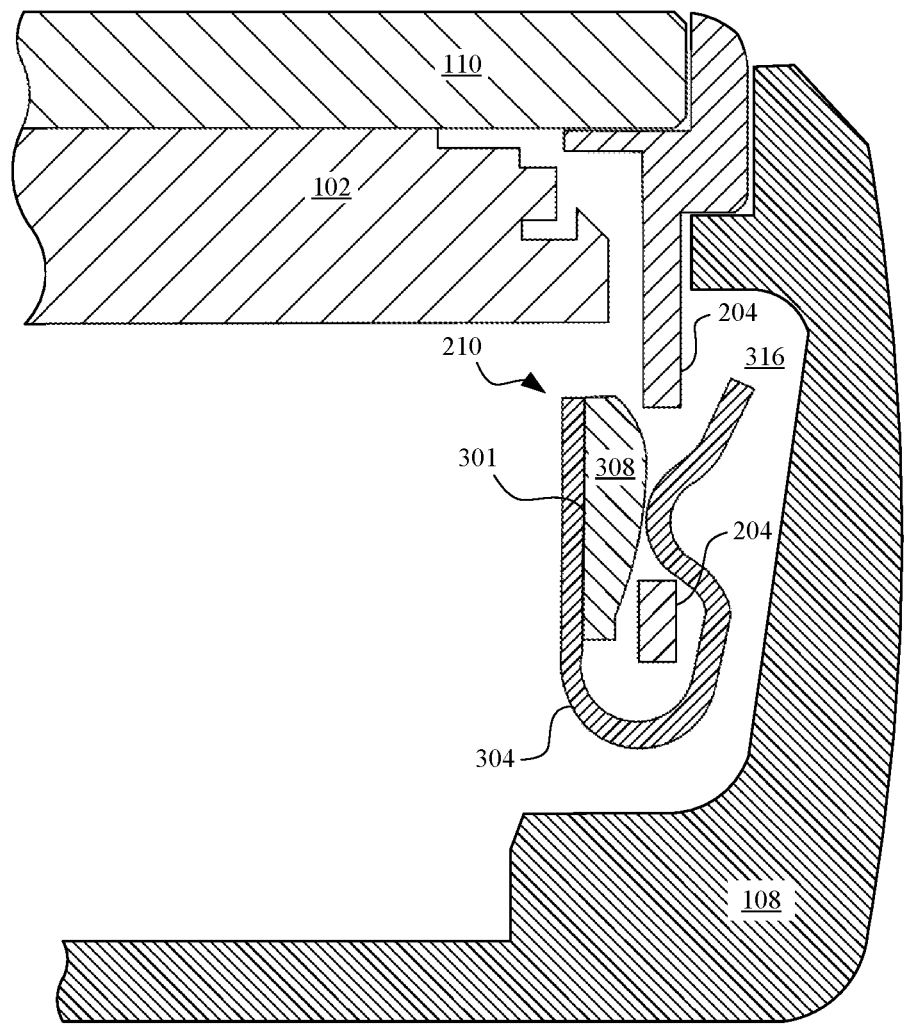
FIG. 3C shows a cross-sectional view of the button bracket depicted in FIG. 4B disposed within the housing body of the portable electronic device.

FIG. 3C depicts a cross-sectional view of snap clip 304 in accordance with section line A-A of FIG. 3B when it is installed in housing body 108 and engaged with rail 204. As depicted, snap clip 304 interacts with thickened region 308 of button bracket 210 to enclose a lower portion of rail 204. To remove rail 204 from snap clip 304 an upward force can cause snap clip 304 to plastically deform farther into undercut region 316 so that a resulting gap between snap clip 304 and thickened region 308 can allow the lower portion of rail 204 to be disengaged from within snap clip 304. By disengaging these components, display assembly 102 and cover glass 110 can be removed from housing body 108. This removal of rail 204 from snap clip 304 allows various internal components to be serviced and or replaced.

Figure 4A:
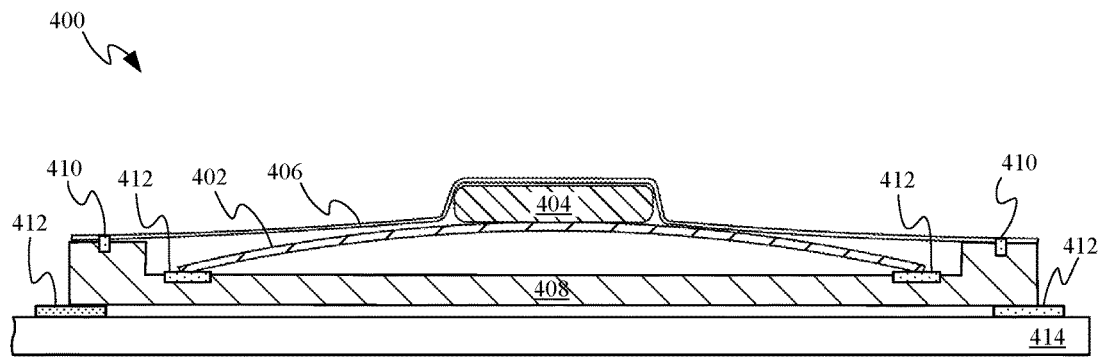
FIG. 4A shows a cross-sectional view of a button assembly, which includes a tactile switch along the lines of a dome switch.

FIG. 4A shows a cross-sectional view of button assembly 400, which includes a tactile switch along the lines of a dome switch. Button assembly 400 utilizes a dome switch 402 to provide user feedback during actuation of button assembly 400. Dome switch 402 includes a switch nub 404 positioned atop dome switch 402 to adjust a height at which dome switch contacts another internal component. This can allow for additional standoff between button assembly 400 and the other internal component. Cover film 406 can be positioned just above dome switch 402 and can prevent water from entering into and potentially causing damage to dome switch 402 by sealing cover film 406 to switch body 408 at locations surrounding dome switch 402, thereby defining an interior volume within which dome switch 402 is contained. If water or moisture does contact dome switch 402, the moisture can adversely affect dome switch 402 by causing shorts and/or corrosion of interior components. Cover film 406 can be sealed to switch body 408 by welding cover film 406 to switch body 408 at weld line 410. In some embodiments, a laser welding apparatus can create weld line 410.

FIG. 4A also shows button assembly 400 mounted to substrate 414. In some embodiments, substrate 414 can be a conventional printed circuit board while in other embodiments substrate 414 can be a flexible circuit board. In either case button assembly is electrically coupled with electrically conductive pathways disposed upon substrate 414 at exterior switch terminals 412. It is the welding of exterior terminals 412 to substrate 414 that can cause and other assembly operations that can cause an increase in heat, which leads to the gas expansion problems described above. Other assembly operations can include the joining of button assembly 400 by an underfilling operation in which high temperature glue is applied to a surface of button assembly 400. While exterior switch terminals are shown in exposed positions, it should be noted that other dampers and covers can be utilized to water-proof exterior switch terminals 412.

Figure 4B:
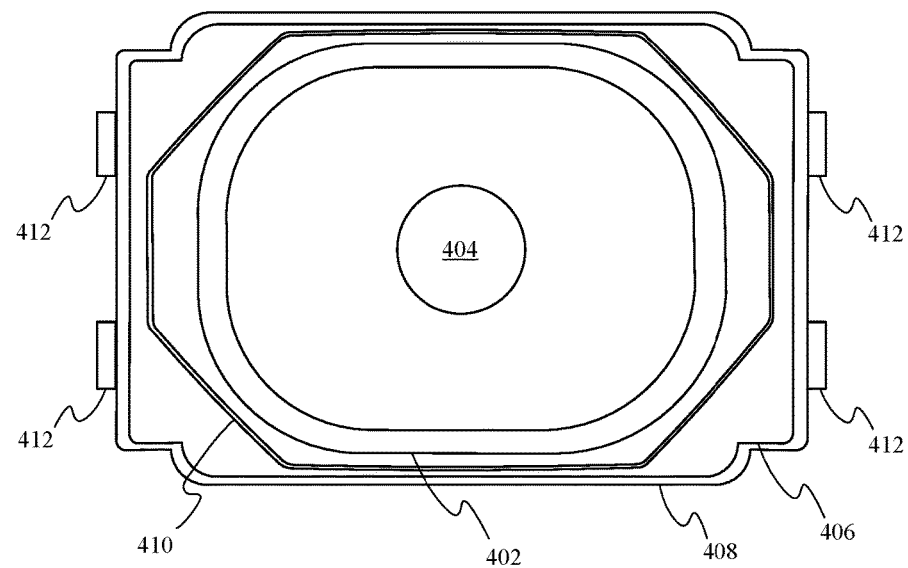
FIG. 4B shows a top view of the button assembly depicted in FIG. 4A.

FIG. 4B shows a top view of button assembly 400 in which weld line 410 entirely surrounds dome switch 402 and seals air surrounding dome switch 402 beneath cover film 406. In some embodiments, cover film 406 can be formed of a thin layer of polymeric film. In one particular embodiment, a polyethylene terephthalate polyester film can be used to form cover film 406. Unfortunately, while entirely surrounding dome switch 402 with cover film 406 and completely sealing it to switch body 408 at weld line 410 can provide robust water intrusion prevention for button assembly 400, subsequent welding or mounting operations can cause heat build up that causes at least temporary expansion of air or gases within dome switch 402. This gas expansion can adversely affect a feel and/or function of dome switch 402 by causing permanent stretching of cover film 406. FIG. 4B also depicts how internal switch terminals 412 enjoy the benefit of being encased beneath cover film 406. Internal switch terminals can be electrical coupled with the external switch terminals 412 so that actuation of dome switch 402 can be transmitted to an external circuit disposed upon substrate 414.

Figure 4C:
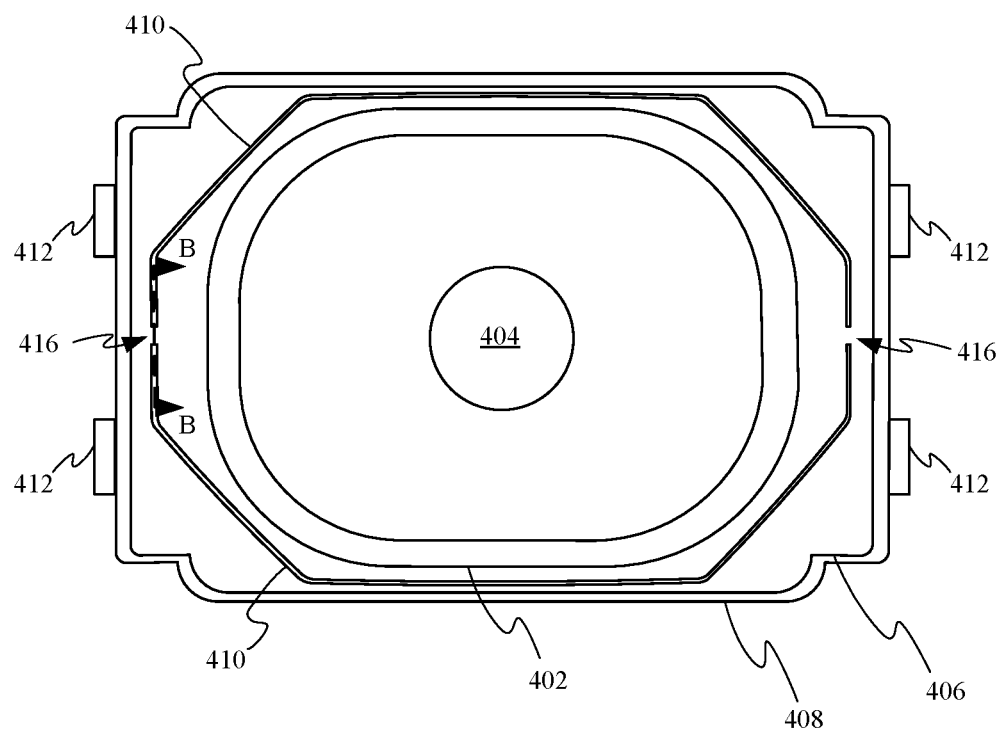
FIG. 4C shows a top view of the button assembly depicted in FIG. 4A with a number of gaps interspersed along a weld line.
Figure 4D:
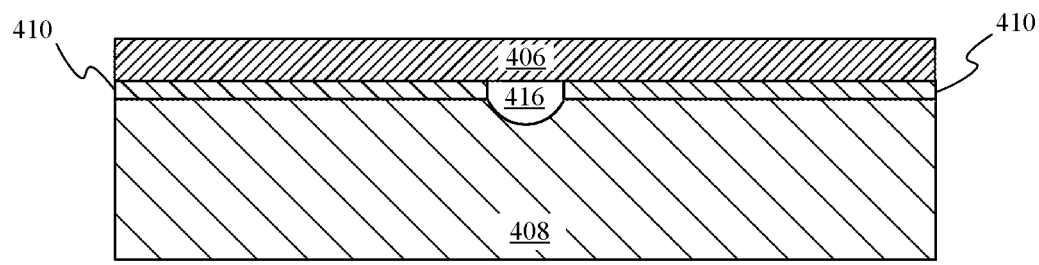
FIG. 4D shows a side view of the button assembly depicted in FIG. 4C.

FIGS. 4C-4G depict various solutions to the expanding gas problem discussed above. FIG. 4C depicts how weld line can include small breaks 416 that form vents in weld line 410 that allow air to exit from within the area defined by weld lines 410. By sizing breaks 416 large enough to allow air to escape and small enough so that surface tension generally keeps liquid water from entering through breaks 416, a robust water-proof barrier can exist without trapping air beneath cover film 406. In some embodiments, breaks 416 can be sized to be about 0.05 mm long so that air exchange is allowed without significantly degrading the mechanical strength of the joint formed by weld lines 410. By leaving breaks 416 between weld lines 410, exposed air disposed within dome switch 402 doesn't stay trapped at any time and various heat excursions caused by high loading of an associated device will also not cause problems with expansion of air within button assembly 400. FIG. 4D shows a cross-sectional side view of the solution depicted in FIG. 4C in accordance with section line B-B. In some embodiments, a trough or notch can be disposed within switch body 408 so that when a welding apparatus passes over the notch a small gap coincident with the notch is formed. In this way, break 416 can be generated without resetting the welding apparatus because the notch prevents cover film 406 from welding in the location directly over the notch. It should be noted that increasing the number of breaks 416 tends to decrease a risk of liquid intrusion.

Figure 4E:
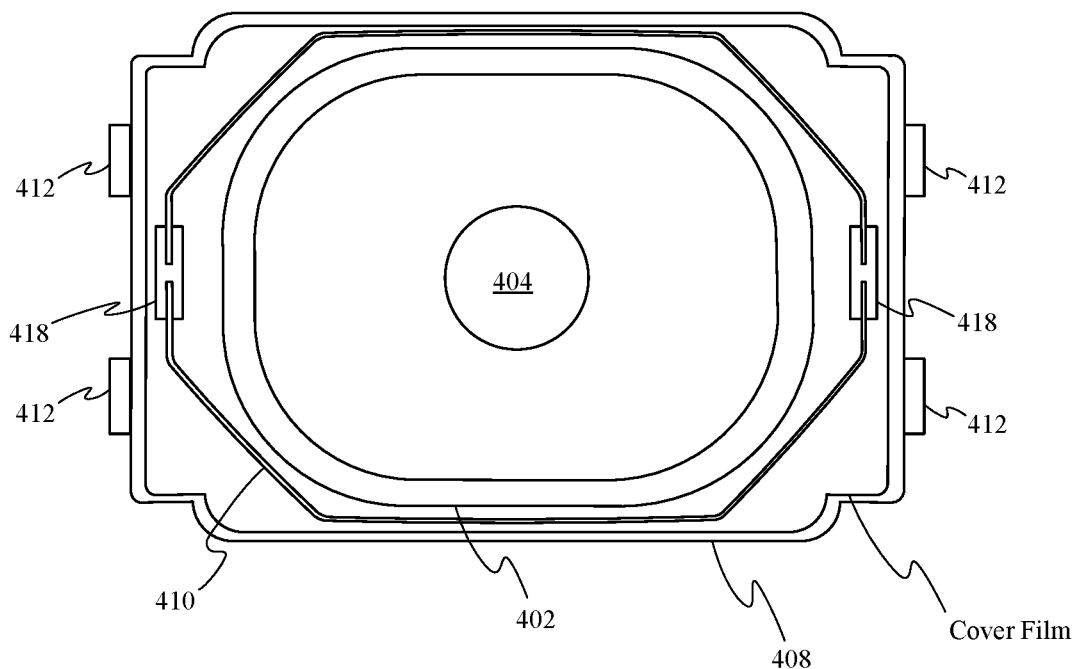
FIG. 4E shows a top view of the button assembly depicted in FIG. 4A with a number of gaps in a weld line accounted for by layers of pressure sensitive adhesive.

FIG. 4E shows another embodiment in which adhesive layers 418 are placed between switch body 408 and cover film 406 prior to forming weld lines 410. In this way weld lines can partially overlap adhesive layers 418 and still leave a small break 416. Because cover film 406 adheres to adhesive layers 418, cover film 406 can be completely adhered to switch body 408; however, when pressure sensitive adhesive (PSA) that is compliant enough to allow air exchange during mounting and/or underfilling of the button assembly, then air within button assembly 400 can be exchanged without damaging button assembly 400. Adhesive layers 418 can have a thickness of between about 10 and 20 microns. In this way a likelihood of water intruding within button assembly 400 through breaks 416 can be reduced. It should be noted that in some embodiments heat-cured or ultraviolet cured adhesive can be used and activated only after attaching button assembly 400 to a printed circuit board by underfilling or surface mounting (SMT) techniques.

Figure 4F:
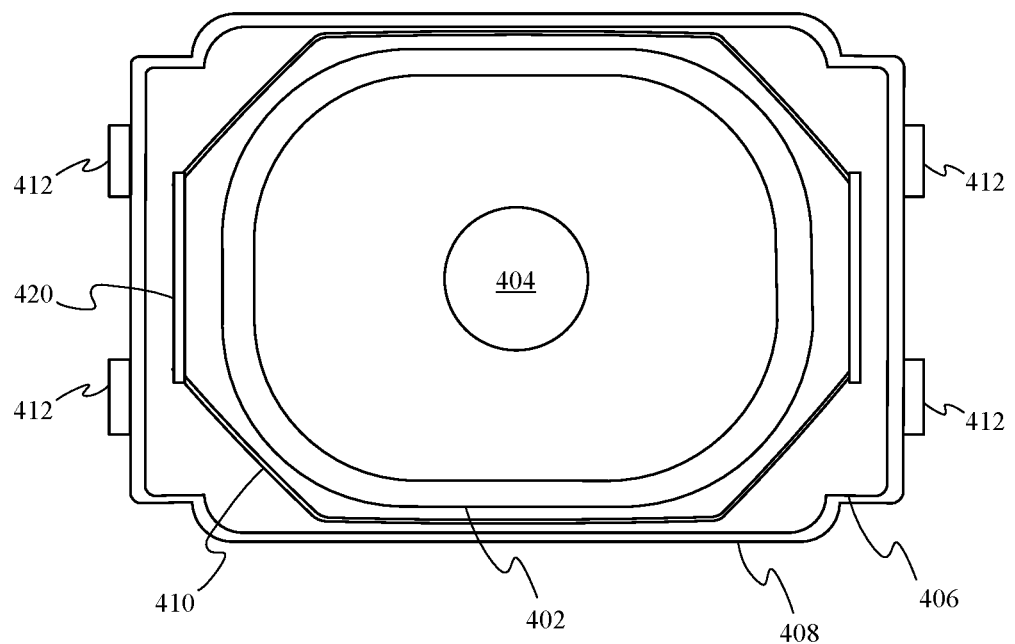
FIG. 4F shows a top view of the button assembly depicted in FIG. 4A with a number of gaps in a weld line closed by a second set of weld lines.
Figure 4G:
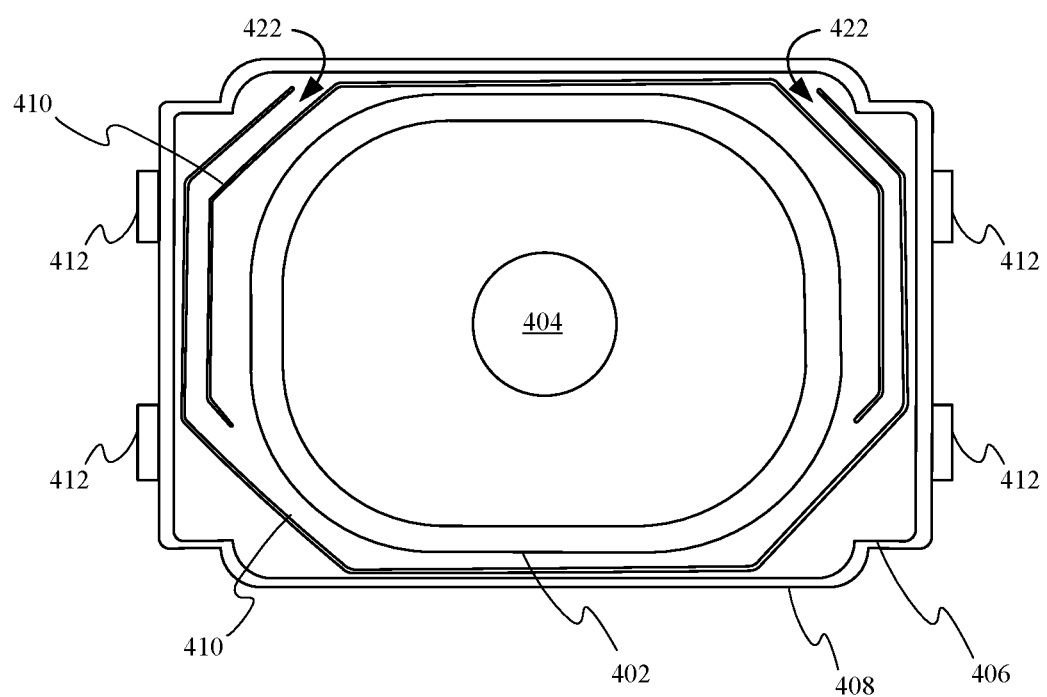
FIG. 4G show a top view of a button assembly that includes two sets of welds that cooperate.

FIG. 4F shows another embodiment in which welds 420 are added after SMT and/or underfill of button assembly 400. As depicted the welds should overlap to ensure the weld is fully completed even over the positioning tolerance of the welding system. The angle between the two welds should be as obtuse as possible, preferably greater than 135 degrees to prevent stress concentrations forming at the intersections of the welds during switch cycling. The welds can be positioned by using a vision system to determine a position of weld lines 410 so that overlap of welds 420 with weld lines 410 can be confirmed. FIG. 4G shows yet another embodiment in which long channel 422 is created between weld lines 410. The long channel 422 prevents water from easily entering the switch but allows air to easily pass through it.

In some embodiments, portions of weld lines 410 can be substantially parallel to form long channel 422. This labyrinth-like design works best when the weld joints can overlap for multiple millimeters with a very small gap of greater than 0.3 mm in between the two welded paths.

Figure 5:
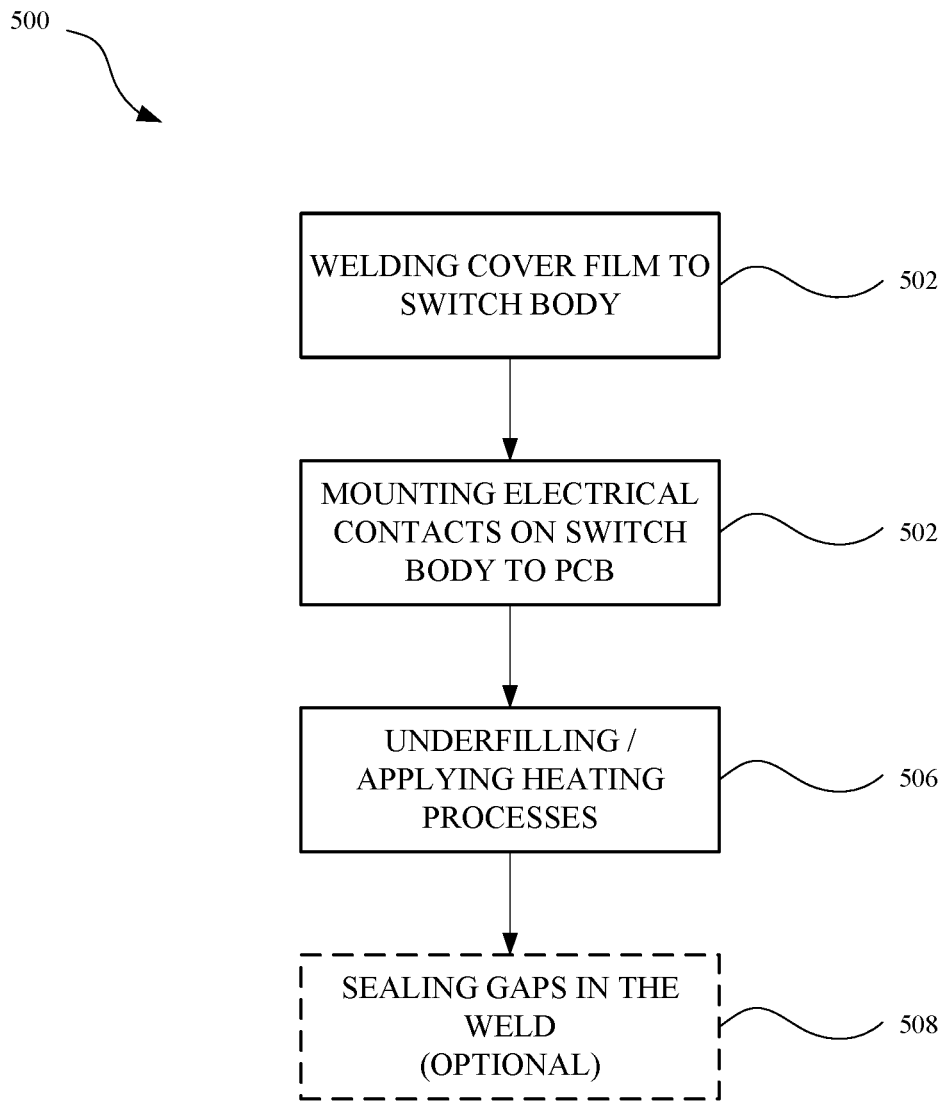
FIG. 5 depicts a flow diagram representing a method for mounting a button assembly.

FIG. 5 shows a flow diagram representing a method for electrically and mechanically coupling a button assembly to a substrate including at least one external circuit. At a first step 502, a thin polymeric film is welded over a switch body to protect a tactile switch disposed on the switch body. At step 504, the switch body is surface mounted (SMT) to a printed circuit board (PCB). During the SMT processes air is allowed to escape from within a volume defined by the thin polymeric film and the switch body through a number of gaps left open during the welding process. At step 506, the joint between the PCB and the switch body can be enhanced by underfilling it with heated adhesive. In some embodiments, after the SMT process and the underfilling at step 508, the gaps can be closed off using any of a number of processes. The processes can include adding additional welds to close the gaps between the welds, using an adhesive substrate to create a weak bond over the gap, and/or positioning the welds to create a long channel between the welds.

Figure 6A:
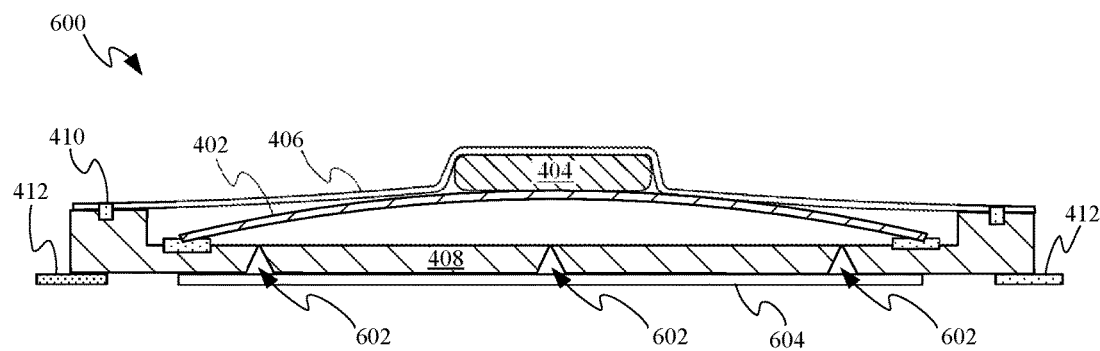
FIGS. 6A-6B show cross-sectional and bottom views of a button assembly including a protective layer that prevents ingress of liquid though a number of tooling pin holes defined by a switch body.
Figure 6B:
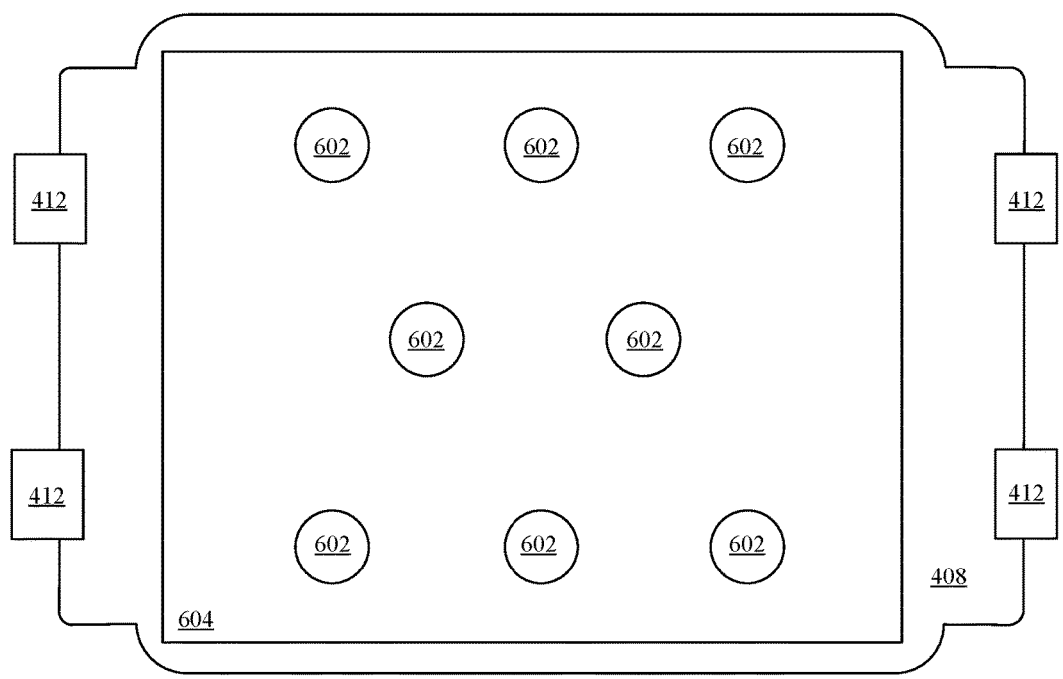

FIG. 6A shows a cross-sectional view of button assembly 600, which includes a tactile switch along the lines of a dome switch having a configuration similar to the dome switch depicted in FIG. 4A. However, while the embodiment described in FIGS. 4A and 4B led to a condition in which gas expansion caused damage to cover film 406 and/or dome switch 402 due to cover film 406 completely sealing gases around dome switch 402, in this embodiment, body 408 includes tooling pin holes 602 that can facilitate the transfer of air into and out of the interior volume defined by cover film 406 and switch body 408. Unfortunately, tooling pin holes 602 can allow water to ingress into the interior volume of button assembly 600. Consequently, protective layer 604 can be added along a bottom surface of switch body 408 to prevent water or liquid ingress. Protective layer 604 can be a thin layer of pressure sensitive adhesive (PSA) or heat activated film (HAF). Tooling pin holes 602 can provide an additional avenue through which air can pass into or out of switch body 408. In some embodiments, this air exchange could be facilitated both through tooling pin holes 602 and through breaks or gaps in weld lines 410 that secure cover film 406 to switch body 408 (e.g., see FIG. 4C). FIG. 6B shows a bottom view of button assembly 600, and how tooling pin holes 602 can be evenly spread across a bottom surface of switch body 408. FIG. 6B also shows how protective layer 604 extends across all of tooling pin holes 602, so that liquid in proximity to tooling pin holes 602 is prevented from entering the interior volume of button assembly 600.

Figure 7A:
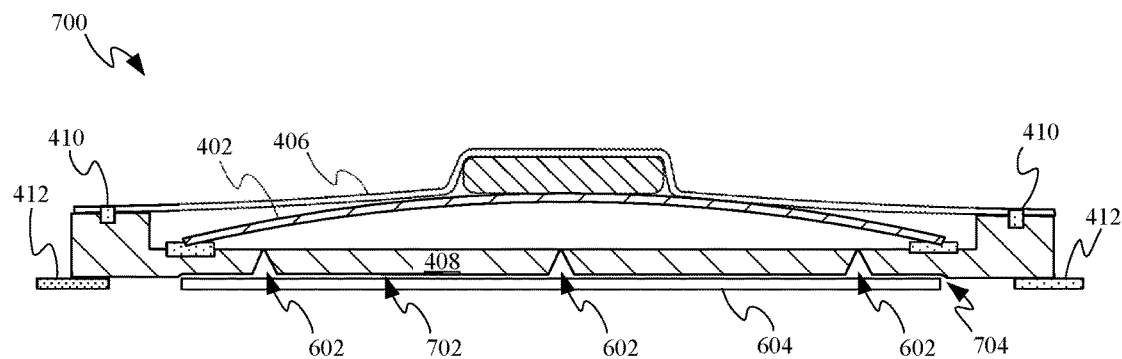
FIGS. 7A-7B show cross-sectional and bottom views of a button assembly similar to the one depicted in FIGS. 6A-6B in which a number of venting trenches are defined by the switch body.
Figure 7B:
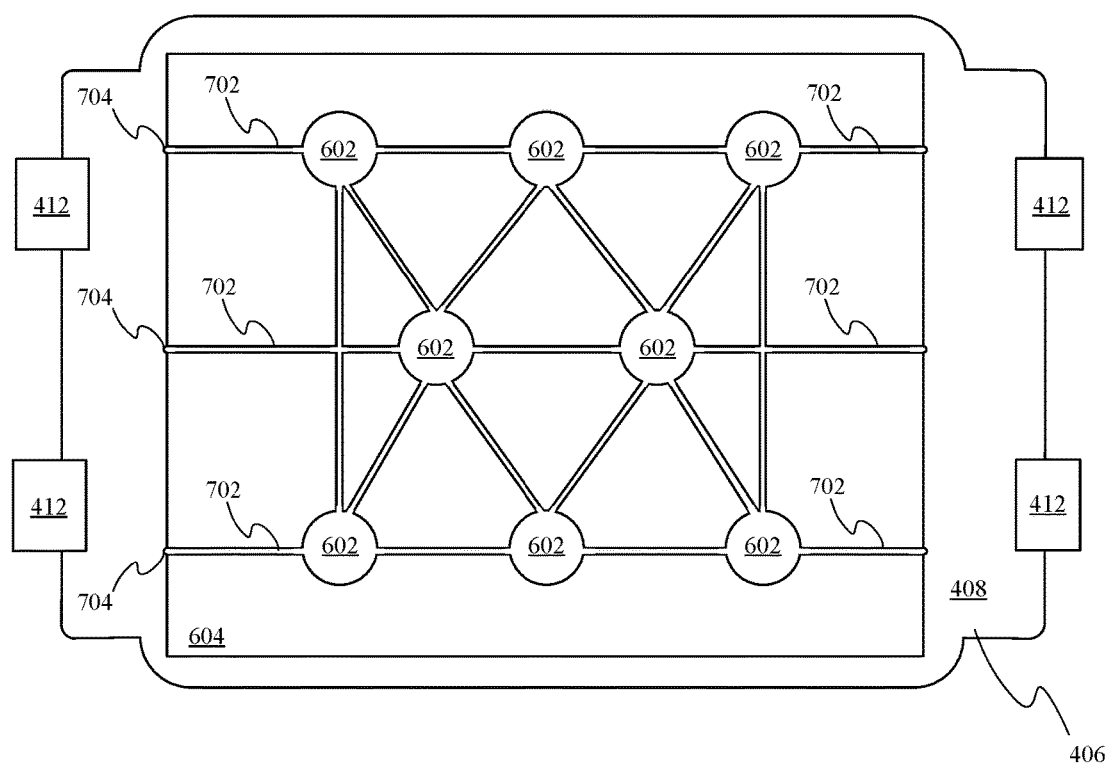

FIG. 7A shows another button assembly 700 similar to the one shown in FIG. 6A in which a series of venting trenches 702 are from along a bottom surface of switch body 408. Button assembly 700 includes venting trenches 702 that provide a pathway along which air can flow. Such a configuration can prevent undue bubbling of protective layer 604 when air within the interior volume defined by button assembly 700 expands or contracts causing air within the interior volume to exit or enter button assembly 700. To prevent the ingress of liquids, entry area 704 and in some embodiments venting trenches 702 can be narrow enough so that the surface tension of liquids prevents the liquid from entering button assembly 700. FIG. 7B shows a bottom view of button assembly 700 in which venting trenches 702 are laid out in an exemplary manner. This configuration allows air to flow directly from either of two opposing sides of protective layer 604 into any one of tooling pin holes 602. It should be understood that this layout of venting trenches 702 is made for exemplary purposes only. For example, venting trenches 702 can be arranged so that only a subset of tooling pin holes 602 is accessible by venting trenches 702.

Figure 8A:
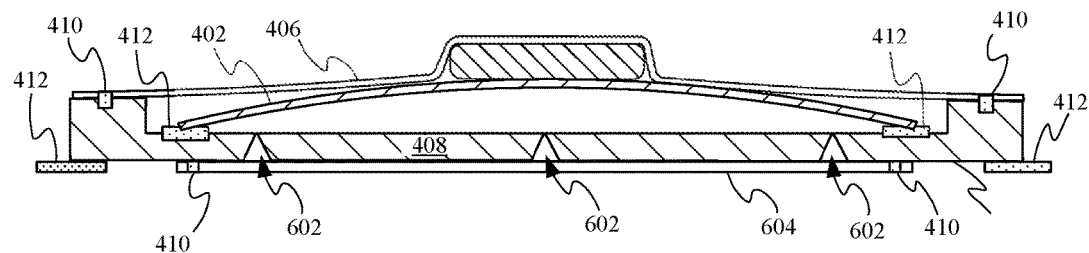
FIGS. 8A-8B show cross-sectional and bottom views of a button assembly similar to the one depicted in FIGS. 6A-6B in which the protective layer is welded to the switch body.
Figure 8B:
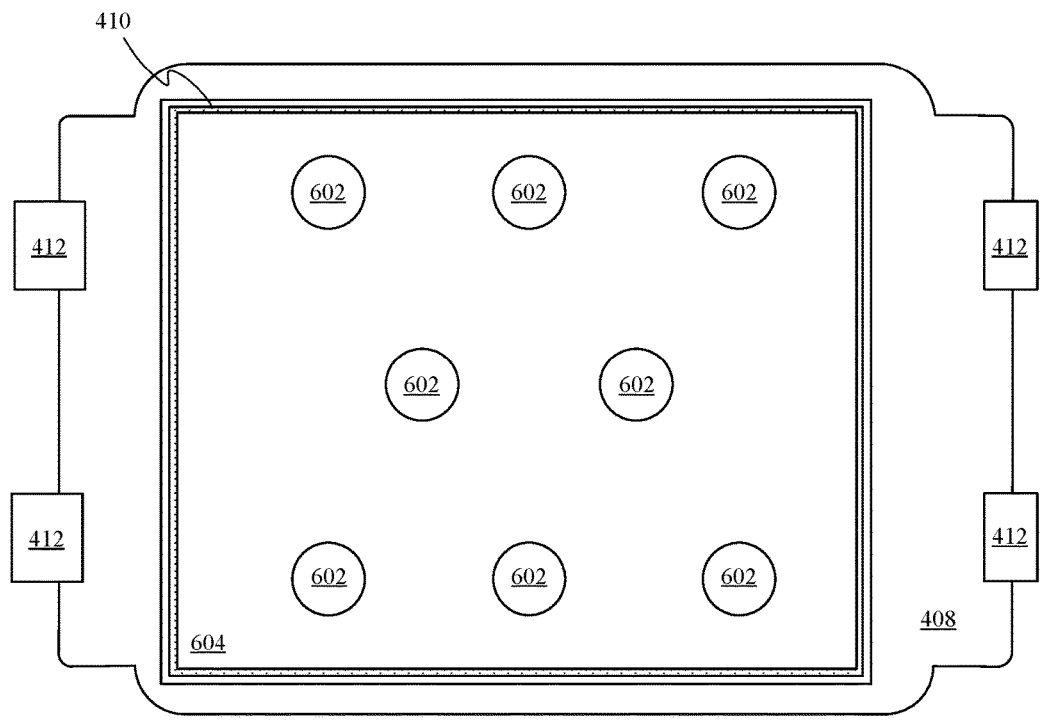

FIG. 8A shows another configuration in which protective layer 604 is welded over the bottom surface of switch body 408 at weld lines 410. In such an embodiment, protective layer 604 need not have any inherent adhesive properties and can be formed from a more neutral material along the lines of a polyester film. By positioning protective layer 604 in this way, protective layer 604 can block both air exchange and liquid ingress through tooling pin holes 602. In some embodiments, this can be desirable when air exchange pathways are already setup through cover film 406, as shown in previously described embodiments. FIG. 8B shows how weld line 410 can create an unbroken perimeter around protective layer 604, thereby preventing air that passes through tooling pin holes 602 from escaping through an interface between protective layer 604 and switch body 408.

Figure 9A:
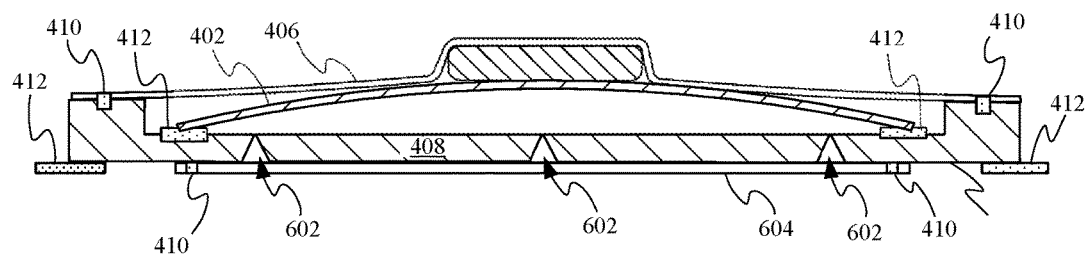
FIGS. 9A-9B show cross-sectional and bottom views of a button assembly similar to the one depicted in FIGS. 8A-8B in which the weld joining the protective layer to the switch body includes a number of breaks.
Figure 9B:
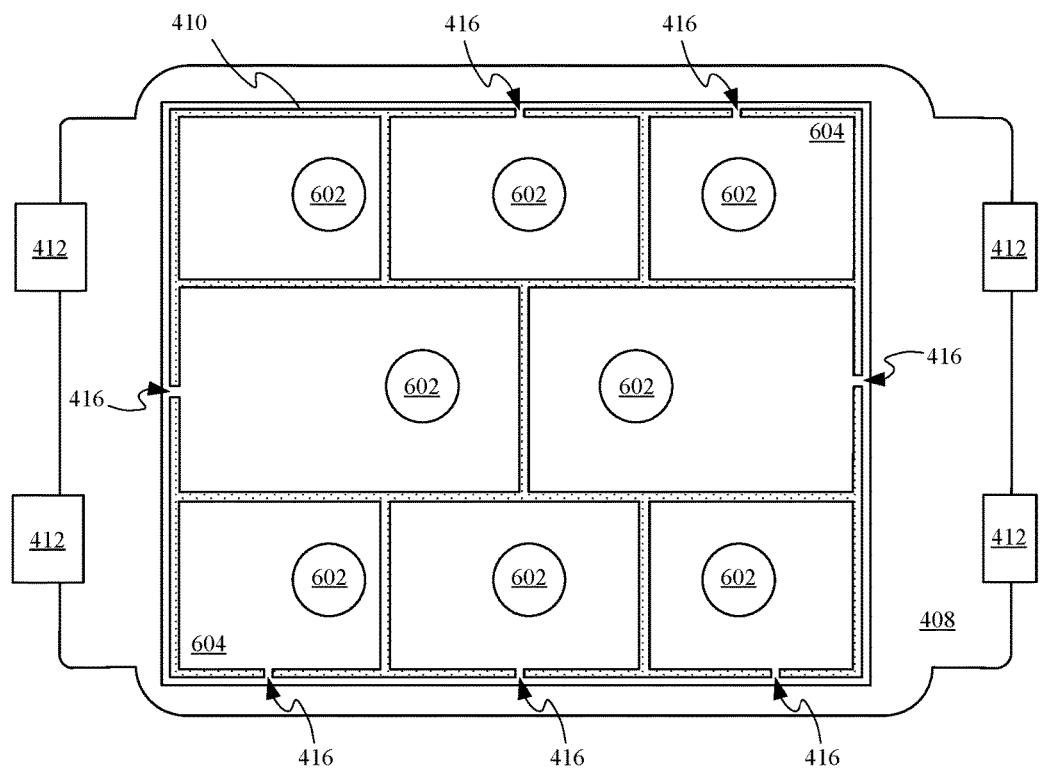

FIGS. 9A-9B show another configuration in which protective layer 604 is welded to switch body 408; however, in this embodiment weld 410 associated with protective layer 604 includes a number of breaks that allow air to pass through the interface between switch body 408 and protective layer 604. In some embodiments, as depicted, weld 410 can be arranged so that each one of tool pin holes 602 is isolated from other tool pin holes 602 by weld lines 410. Some weld lines 410 can completely isolate tool pin holes 602, thereby preventing gases from escaping the isolated tool pin holes 602. Other weld lines 410 can allow air exchange through a single tooling pin hole 602 by way of one or more gaps or breaks 416 in weld line 410.

Figure 10A:
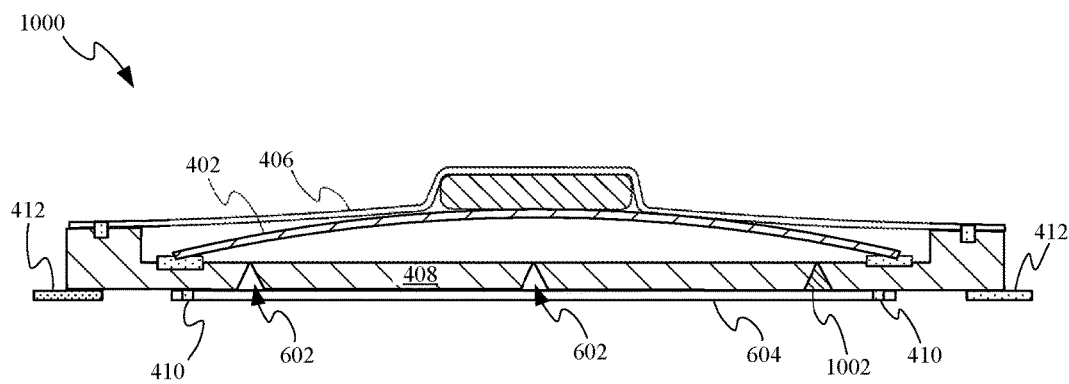
FIGS. 10A-10B show cross-sectional and bottom view of a button assembly similar to the one depicted in FIGS. 8A-8B in which a selected number of tooling pin holes are filled with epoxy.
Figure 10B:
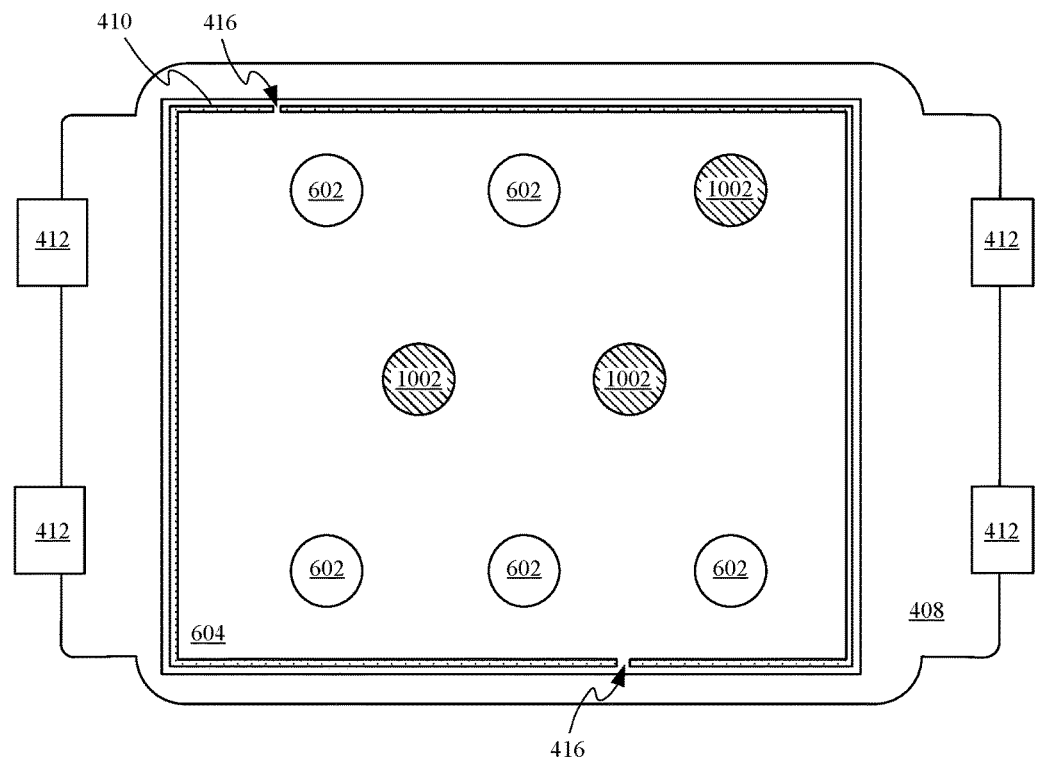

FIGS. 10A-10B show another embodiment in which selected ones of tool pin openings 602 are filled with epoxy 1002. In this way, the number of tooling pin holes 602 that are exposed can be limited so that a rate at which air cycles into and out of button assembly 1000 can be established independent of a number of tooling pin holes 602 necessary for a particular assembly or machining operation. Weld line 410 can include a number of breaks 416 that allow air to cycle into and out of tool pin holes 602 that are not filled with epoxy 1002. In some embodiments, epoxy can be utilized to limit a size of one or all of tooling pin holes 602. While about half of tooling pin holes 602 are filled with epoxy 1002 any number of tooling pin holes 602 can be filled. For example, tooling pin holes 602 can be arranged near a periphery of protective layer 604 while centrally disposed tool pin holes 602 can be left open. It should be noted that any of the previously discussed embodiments could be combined or mixed to achieve a balanced flow of air into and out of the interior volume defined by a button assembly.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a processor of a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A portable electronic device, comprising:
   a first housing component, comprising sidewalls and a bottom wall that cooperate to form a cavity, a top portion of each of the sidewalls cooperating to define a front opening leading into the cavity;
   a second housing component, comprising: a transparent substrate having a size and shape in accordance with the front opening, and a rail extending from an interior facing surface of the transparent substrate;
   a button bracket, comprising:
      a rigid substrate defining fastener openings, the rigid substrate being fastened to an interior surface of a first sidewall of the sidewalls in a location proximate a button opening that extends through the first sidewall,
      a tactile switch retaining feature disposed on a first end of the rigid substrate, and
      a snap clip coupled with a second end of the rigid substrate; and
   a tactile switch engaged with the tactile switch retaining feature so that it is positioned behind the button opening defined by the first housing component,
   wherein the snap clip retains the second housing component within the front opening of the first housing component by engaging an opening defined by the rail of the second housing component.

2. The portable electronic device as recited in claim 1, wherein the rigid substrate defines an opening that accommodates the tactile switch on the button bracket.

3. The portable electronic device as recited in claim 1, wherein the button bracket further comprises a z-retention feature that prevents movement of an internal component within the electronic device.

4. The portable electronic device as recited in claim 1, wherein the second end of the rigid substrate is forged to form a thickened portion that is in direct contact with the snap clip.

5. The portable electronic device as recited in claim 4, wherein the thickened portion and the snap clip cooperate to enclose the rail of the second housing component.

6. The portable electronic device as recited in claim 1, wherein the electronic device further comprises a retention mechanism coupled to a second sidewall of the sidewalls, the second sidewall being opposite the first sidewall.

7. The portable electronic device as recited in claim 6, wherein the retention mechanism comprises two snap clips that engage another rail extending from the interior facing surface of the second housing component, and wherein the retention mechanism cooperates with the snap clip of the button bracket to retain the second housing component to the first housing component.

8. A portable electronic device, comprising:
   a housing, comprising a housing wall defining an opening;
   a button assembly, comprising:
      a button cap positioned within the opening defined by the housing wall, the button cap being configured to receive a user input,
      a switch body,
      a dome switch coupled with a first surface of the switch body and configured to receive the user input by way of the button cap, and
      a layer of film extending over and surrounding the dome switch, wherein the layer of film is welded to the switch body so that welds join the layer of film to the switch body, the welds cooperating to define an interface between the switch body and the layer of film that prevents liquids from entering or exiting an interior volume defined by the layer of film and the switch body.

9. The portable electronic device as recited in claim 8, wherein an end of each of the welds is separated from a portion of an adjacent weld by no more than 5 mm.

10. The portable electronic device as recited in claim 9, wherein at least two of the welds run parallel to define a channel configured to allow gases to circulate into and out of the interior volume.

11. The portable electronic device as recited in claim 8, wherein the switch body defines holes that extend through the first surface of the switch body and a second surface of the switch body opposite the first surface.

12. The portable electronic device as recited in claim 11, wherein the button assembly further comprises a protective layer coupled with the second surface of the switch body and covering the holes.

13. The portable electronic device as recited in claim 12, wherein the protective layer is a layer of heat activated film.

14. The portable electronic device as recited in claim 12, wherein the protective layer is a layer of pressure sensitive adhesive.

15. The portable electronic device as recited in claim 12, wherein the protective layer is welded to the switch body.

16. An electronic device, comprising:
   a button assembly, comprising:
      a button cap configured to receive a user input,
      a switch body,
      a dome switch coupled with a first surface of the switch body and configured to receive the user input by way of the button cap, and
      a layer of film extending over and surrounding the dome switch, wherein the layer of film is welded to the switch body by welds that join the layer of film and the switch body, the welds cooperating to define an interface between the switch body and the layer of film that prevents liquids from entering or exiting an interior volume defined by the layer of film and the switch body.

17. The electronic device as recited in claim 16, wherein the switch body defines pin holes that allow gases to enter and exit the interior volume, wherein at least one of the pin holes is filled with epoxy to adjust a flow of air through the pin holes, and wherein the switch body includes contacts for electrically coupling the button assembly to another electrical component of the electronic device.

18. The electronic device as recited in claim 17, further comprising a protective cover coupled with a second surface of the switch body after installation of the button assembly into the electronic device that overlays one end of each of the pin holes to prevent liquids from entering the interior volume through any one of the pin holes.

19. The electronic device as recited in claim 18, wherein the second surface defines channels extending between the pin holes, and wherein the channels allow gases to enter and exit the interior volume of the interior volume without allowing liquids to enter and exit the interior volume.

20. The electronic device as recited in claim 18, wherein the protective cover comprises a layer of heat activated film and is welded to a second surface, wherein the layer of film is joined to the switch body by other welds that close any gaps between the welds and wherein the protective cover is welded to the switch body in a manner that isolates each of the holes defined by the switch body.

* * * * *